Aug. 31, 1954
E. C. CROWTHER
2,687,862
FASTENER
Filed Nov. 12, 1949
2 Sheets-Sheet 1
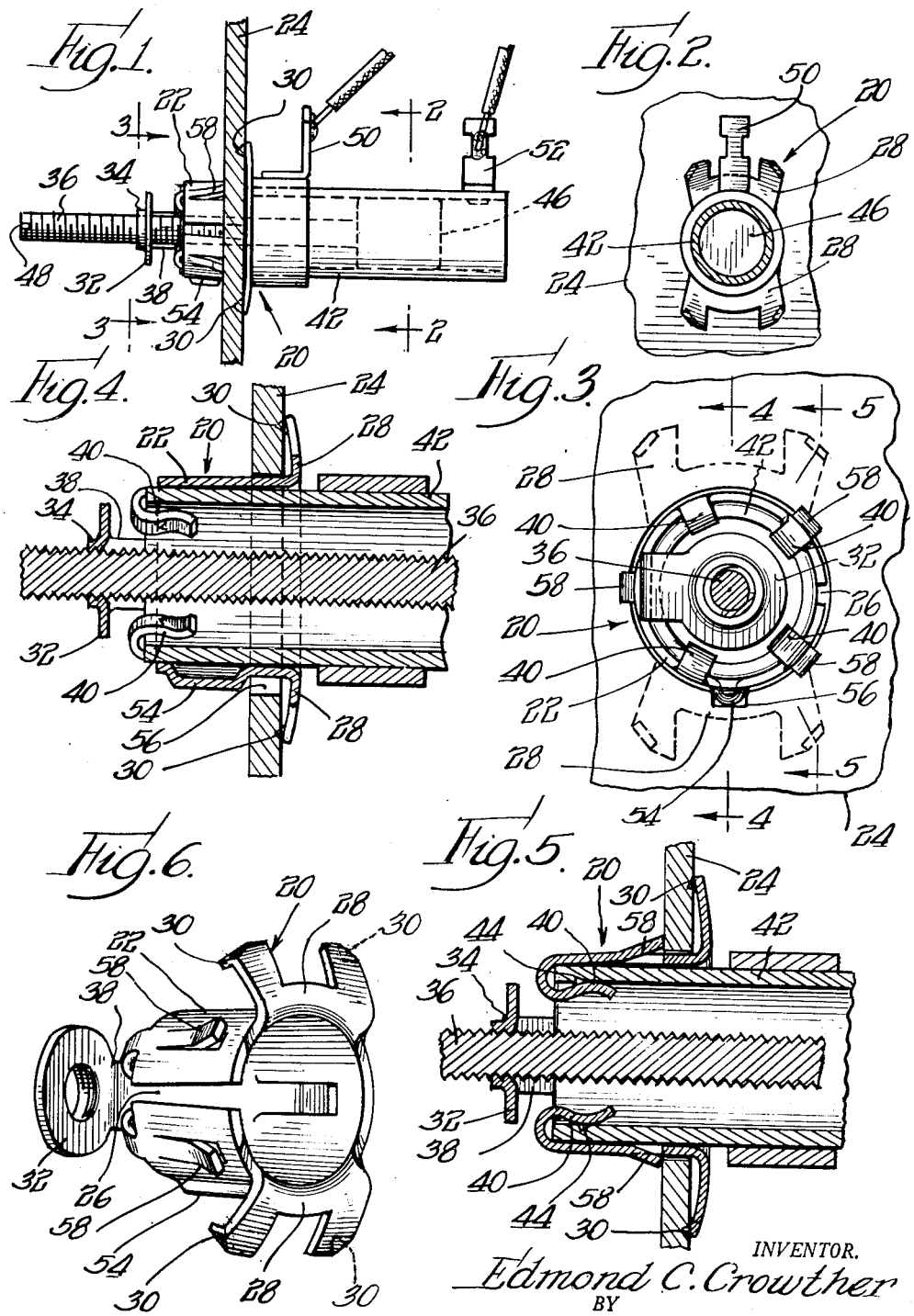
INVENTOR.
Edmond C. Crowther
BY
Moore, Olson & Trexler
attys.

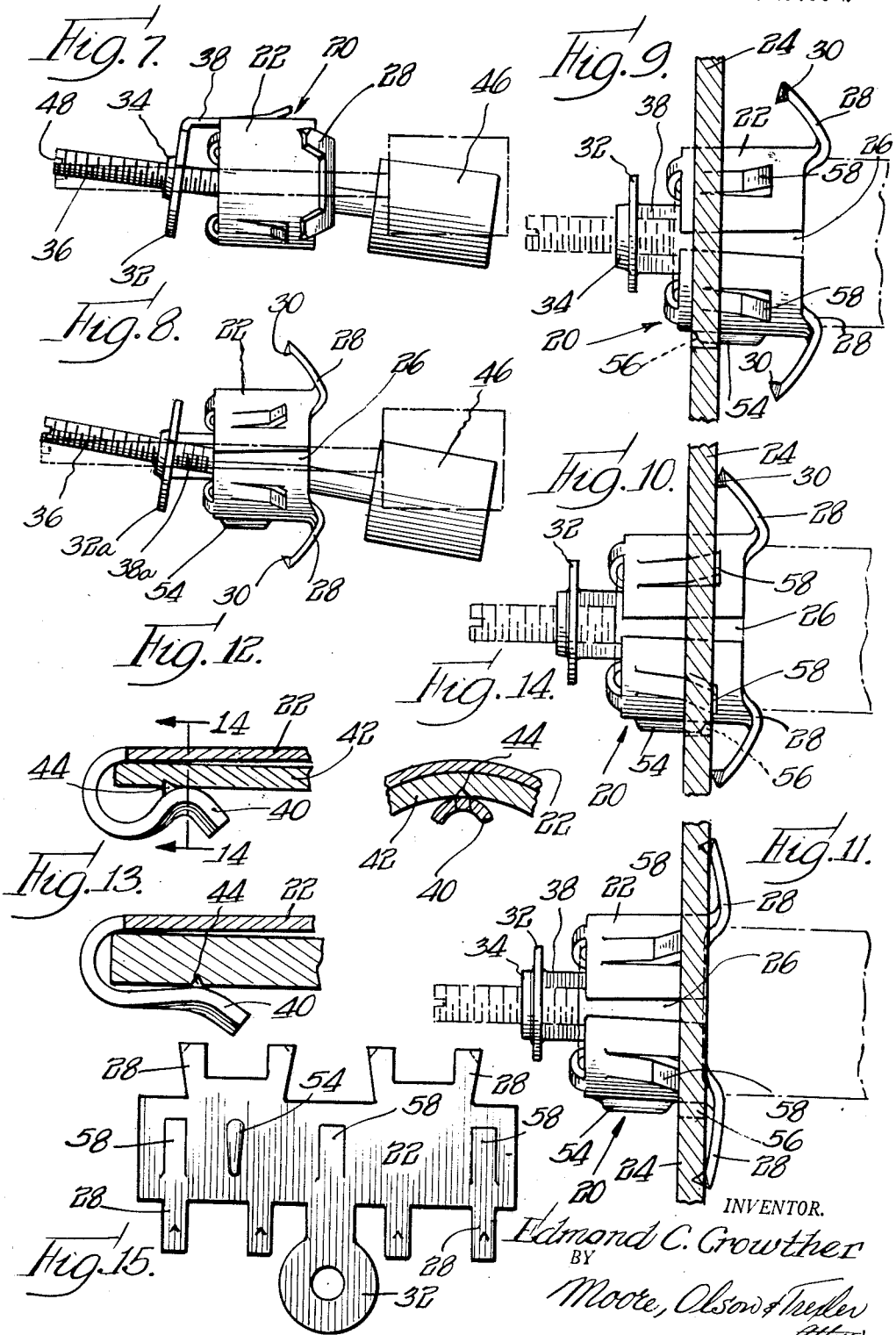

Patented Aug. 31, 1954

2,687,862

UNITED STATES PATENT OFFICE 2,687,862

FASTENER

Edmond C. Crowther, Philadelphia, Pa., assignor to Illinois Tool Works, Chicago, Ill., a corporation of Illinois Application November 12, 1949, Serial No. 126,850

2 Claims. (Cl. 248—27)

This invention relates generally to snap-in fasteners, and more particularly to snap-in fasteners of the tubular or hollow type.

More specifically, the present invention is concerned with a sheet metal snap-in type tubular fastener or clip designed to accommodate a combined shell and screw member, and to frictionally resist loosening of the screw member after the clip has been snapped into position in a panel or flat work section. In the radio industry it is not uncommon to require the use of fasteners for securing a cylindrical part within an aperture of a sheet metal support or panel. For example, iron core condensers employing a threaded stud element require a fastener which not only accommodates the cylindrical shell or sleeve of the condenser, but also the threaded stud thereof.

It is an important object of the present invention to provide a sheet metal hollow fastener which will serve effectively to accommodate the larger cylindrical part such as the condenser shell, and also the threaded screw element of smaller diameter, in such a manner as to secure the screw in any desired position of adjustment and prevent rotational and axial movement of the condenser shell or body after the fastener has been completely snapped into position.

It is a further object to provide a fastener or clip of the type referred to above wherein improved, novel means is provided for guiding the hollow or tubular shell of the fastener as it is initially inserted within the aperture of a panel, and other means is provided for securing the fastener against rotation within the panel after it has been completely inserted within the aperture.

Another object of the present invention is to provide a tubular snap-in fastener having a novel arrangement for lockingly impinging the inner periphery of a tubular article to secure said article against axial or longitudinal displacement with respect to the fastener. To this end the invention contemplates spurs or teeth formed from material extending beyond one extremity of the tubular fastener body.

Still more specifically, the present invention contemplates a tubular snap-in fastener in which the entering extremity thereof supports a screw accommodating element having a thread helix normally out of phase with the screw element which it is designed to accommodate so that as said screw element is rotated within said helix and finally brought into axial alignment with the tubular fastener body, the threads of said screw will be frictionally gripped so as to resist subsequent rotation of the screw.

A still further object of this invention is to provide the screw accommodating helix in association with a tubular fastener as pointed out above, which is so arranged as to necessitate disalignment of the screw member with respect to the fastener axis during the initial insertion of the threaded member, subsequent axial alignment of the screw member serving to establish increased frictional gripping of the thread helix with the screw thread convolutions.

The foregoing and other objects and advantages will be more apparent from the following detailed description when considered in connection with the accompanying drawings wherein:

Fig. 1 is a side elevational view showing the fastener of the present invention mounted in an apertured panel and supporting the body of the cylindrical body of a condenser sleeve and the adjusting screw of said condenser;

Fig. 2 is a vertical transverse sectional view taken substantially along the line 2—2 of Fig. 1;

Fig. 3 is an enlarged vertical sectional view taken substantially along the line 3—3 of Fig. 1;

Fig. 4 is a vertical sectional view taken substantially along the line 4—4 of Fig. 3;

Fig. 5 is a detailed sectional view taken along the line 5—5 of Fig. 3 more clearly to illustrate the manner in which the resilient tabs extending from one extremity of the body lockingly impinge the inner periphery of the condenser casing;

Fig. 6 is a perspective view of the tubular fastener shown in Figs. 1 to 5 inclusive;

Fig. 7 discloses the tubular fastener illustrated in the previous figures prior to insertion within the aperture of the supporting panel, and illustrating the manner in which the condenser adjusting screw is inclined to the fastener axis as the screw is initially applied thereto, dot and dash lines indicating the aligned position of the condenser screw after it has been finally mounted within the work panel as shown in Fig. 1;

Fig. 8 illustrates a tubular fastener having a slightly modified form of screw accommodating member bent transversely with respect to the fastener axis and then twisted so as to position the helix thereof out of phase or alignment with the fastener axis;

Fig. 9 illustrates the manner in which the tubular clip when initially inserted within an aperture provided with a keyway is guided by a key extending radially outwardly from and formed integral with the tubular fastener body;

Fig. 10 illustrates the position occupied by the fastener of Fig. 9 after it has been inserted to the point where the locking teeth provided on the resilient head of the fastener impinge the adjacent surface of the work panel, in which position the key is about to leave its companion keyway;

Fig. 11 discloses the fastener of Figs. 9 and 10 finally tightened in a position with the shoulders provided by resilient tongues engaging one side of the panel and the teeth of the fastener head or flange engaging the opposite side of the panel;

Figs. 12 and 13 are fragmentary sectional views illustrating how the locking tabs are self-adjusting to accommodate condenser tubes made from various thicknesses of stock;

Fig. 14 is a fragmentary transverse sectional view taken along the line 14—14 of Fig. 12 to illustrate more in detail the structural characteristics of the locking tab, and Fig. 15 is a plan view illustrating the blank from which the tubular fastener may be produced.

Referring now to the drawings more in detail wherein like numerals have been employed to designate similar parts throughout the various figures, it will be seen that the present invention contemplates a tubular snap-in fastener designated generally by the numeral 20. The fastener 20 comprises a substantially cylindrical tubular body 22 conforming substantially in diameter with the aperture of the work sheet or panel into which it is to be inserted. In the drawings the panel is designated by the numeral 24, and it will be seen from Figs. 1 and 4 that the body 22 is designed for telescopic association with the work aperture. As will be seen from Fig. 6, a small opening or slit 26 is presented between the adjacent extremities of the stock which forms the body 22, thereby rendering said body collapsible and expansible to a limited extent. One extremity of the body 22 carries oppositely disposed flange or head portions 28. Portions of the flanges 28 are extended radially outwardly and bent axially so as to provide a resilient structure which will flex when the fastener is located in the final supporting position, as illustrated in Figs. 4 and 11. Likewise the extremities of the flanges or head portions 28 are provided with spurs or teeth 30 which are adapted to bite into the outer surface of the panel 24 so as to secure the fastener against rotation within the work aperture.

The opposite or entering extremity of the fastener body 22 carries a screw accommodating member 32 which is centrally apertured to provide a thread accommodating helix, one form of which is illustrated in the drawings. This form of helix consists of an extrusion 34 formed centrally of the member 32, having an internal thread for accommodating a screw such as the condenser adjusting screw 36 illustrated in the drawings. An axially extending neck portion 38 serves as a support for the screw accommodating member 32, said member being spaced axially from the entering extremity of the tubular body 22 and inclined slightly with respect to a plane normal to the fastener axis, as clearly illustrated in Fig. 7. The purpose of this structure will be more clearly apparent from the description which follows.

Attention is directed to a plurality of fingers 40 formed integral with the entering extremity of the body 22 and bent back so as to adjacently superimpose the inner periphery of the body. The space between the free extremities of these fingers or tabs 40 and the inner periphery of the fastener will depend upon the thickness of the stock of the work part or condenser sleeve 42, as clearly shown in Figs. 4 and 12. These fingers 40 are preferably provided with spurs or teeth 44, Figs. 5 and 12, for aggressively impinging, and in fact biting into, the inner periphery of the condenser housing 42. The condenser per se for which the fastener 20 is designed to accommodate, consists of the aforesaid cylindrical tube or housing 42, preferably made of impregnated cardboard or the like, and an inner axially shiftable condenser cylinder 46 which is secured to one extremity of the adjusting screw 36. The outer extremity of the screw 36 is cross slotted at 48 to accommodate a conventional screw driver. The condenser is also provided with radially extending terminals 50 and 52 to which suitable conductors may be secured.

It is important that the condenser unit be so mounted within the panel 24 that the terminals 50—52 extend in a given radial direction. Also it is important that the flange or head portions 28 likewise extend in given radial directions. Hence the fastener is provided with a guiding or key portion 54 which in the disclosed embodiment constitutes a longitudinal extrusion slightly tapered to facilitate initial registration with a complementary keyway or notch 56 communicating with the work aperture. A plurality of outwardly flexed fingers 58 provide work engaging shoulders which cooperate with the flange or head portions 28 in gripping the fastener between opposite surfaces of the work panel 24.

In the use of the fastener or clip 20 for mounting a condenser unit, the adjusting screw 36 is first applied to the screw accommodating helix of the member 32, as shown in Fig. 7. It will be noted that the screw 36 is tilted or inclined with respect to the axis of the tubular body 22 so as to position the screw axis perpendicular to the plane of the member 32. In this position the screw 36 may be freely rotated within the complementary helix in the member 32. The tubular condenser casing 42 may then be telescopically associated with the condenser cylinder 46 and the advancing end of the tube inserted within the tubular fastener body 22. The entering end of the condenser tube or casing 42 becomes automatically gripped by the fingers 40 and these fingers also serve to limit the extent to which the tube may be inserted within the fastener body. As the tube 42 is inserted within the fastener body, the terminals 50—52 are properly positioned with respect to the fastener. In the disclosed embodiment, these terminals extend radially in a direction oppositely disposed from the key 54. Thus, when the combined condenser unit and fastener are subsequently applied to the panel 24 the terminals can only occupy one position, namely, an upwardly extending position, as shown in Fig. 1.

Particular attention is directed to the fact that when the adjusting screw 36 is shifted from the tilted position shown in Fig. 7 to the axially aligned position illustrated by the dot and dash lines of Fig. 7, the head 32 tends to resist such positioning. Hence the thread helix or convolutions of the head 32 exert increased frictional resistance to turning when the screw 36 is positioned coaxial with the tubular body 22. After the adjusting screw has been shifted to the position coaxial with the fastener body 22 and the cylindrical condenser casing 42 has been placed over the condenser cylinder 46 and inserted within the fastener body, the combined fastener and condenser unit are ready for insertion within the work aperture. In fact, this combined condenser unit and fastener presents an article of manufacture which may be sold as a single unit and shipped to a point of fabrication, as for example, to the point at which the radio parts are assembled. To assemble the aforesaid combined condenser unit and fastener with a work panel, it is only necessary to bring the entering extremity of the fastener into registration with the complementary circular opening in the panel and the key 54 in registration with the complementary keyway 56. This is clearly illustrated in Fig. 9. In Fig. 10 the fastener has been moved further into the panel aperture with the spurs 30 in initial contact with the outer surface of the panel. It will be noted that the key 54 has not completely cleared the keyway 56. In other words, the key 54 serves as a guide for properly positioning the fastener in the supporting panel until the spurs 30 move into firm impingement with the panel. After these spurs have been moved into engagement with the panel the fastener is positively secured against rotation, and when the fastener has been shifted to its final position of assembly, as shown in Fig. 11, the key 54 clears the keyway 56 and the fastener is secured against rotation by the firm resiliency of the flanges 28 with their teeth or spurs 30 embedded within the panel. Likewise, the resiliency of the flanges 28 cooperates with the shoulders provided by the free extremities of the spring fingers 58 to assure a firm, clamping fit against opposite sides of the panel.

In Fig. 8 a slightly modified form of screw accommodating head is shown, said head being designated by the numeral 32A, which is carried by a neck 38A. It will be noted that the head 32A is inclined with respect to a plane normal to the fastener axis by imparting a twist to the material adjacent the connecting neck 38A. Obviously the function of the head 32A in lockingly engaging the thread convolutions of the screw 36 when said screw shifts to the dot and dash line position of Fig. 8 is similar to that previously described in connection with the head 32. In both instances the frictional engagement of the complementary thread convolutions in the screw and head is increased sufficiently to prevent inadvertent or unauthorized turning of the adjusting screw. The only time that the adjusting screw should move is when it is positively engaged as by means of a screw driver working in the slot 46. Fig. 13 illustrates the manner in which the finger 40 may be deflected sufficiently to accommodate material of increased thickness as compared with the thinner stock 42 of Fig. 12.

From the foregoing it will be apparent that the present invention contemplates a tubular fastener or clip having improved structural and functional characteristics. By having the screw accommodating helix spaced from the entering extremity of the fastener body and normally positioned out of phase with an axially disposed screw member, a simple and efficiently operable expedient is provided for securing the adjusting screw in any given position of adjustment. Also the guiding member or key serves to assure proper location of the combined fastener and condenser unit as the fastener is initially introduced within the aperture of the supporting panel. The impingement of the locking spurs with the work surface in cooperation with the resiliency afforded by the fastener head positively secures the fastener and condenser unit associated therewith against rotation and axial displacement. The fastener contemplated hereby may be made from a single stamping and conventional manufacturing methods may be employed in the production thereof. A single stamping blank is illustrated in Fig. 15.

Obviously the fastener is not limited in use for supporting condenser units, nor is the invention contemplated hereby limited to the details of construction herein described. It is contemplated that other modifications and changes may be made without departing from the spirit and scope of the appended claims.

The invention is hereby claimed as follows:

1. A one piece sheet material fastener for mounting a hollow sleeve connected with a threaded member onto an apertured work piece, and comprising a tubular body portion having a substantially free inner end, a plurality of integral resilient elements extending radially outwardly from the opposite outer end of said tubular body portion and inclined toward the inner end of said tubular body portion for engagement with one surface of the work piece when the body portion is inserted into the work piece aperture, a plurality of resilient finger elements integral with the body portion and extending laterally from an intermediate part of the body portion and toward the outer end thereof for engagement with the opposite surface of the work piece, a plurality of resilient tabs integral with the body portion at the free inner end thereof and extending radially inwardly therefrom and thence generally toward the outer end of said body portion for receiving and aggressively gripping the hollow sleeve inserted into the body portion between said tabs and the adjacent inner surface of the body portion, a threaded nut-like member adjacent said tabs at the inner end of said body portion, and means connecting said threaded member to the body portion in an inclined position relative to the longitudinal axis of the said tubular body portion for increasing frictional resistance to turning of the threaded member in the nut-like member when the threaded member is positioned coaxially within the tubular body portion and in engagement with said threaded nut-like member.

2. A one piece sheet material fastener as claimed in claim 1, wherein the threaded nut-like member is in the form of an apertured plate having a thread accommodating helix, and wherein the said apertured plate is connected to the body portion by an integral narrow strap projecting axially beyond the inner end of said body portion.

References Cited in the file of this patent

UNITED STATES PATENTS

| Number | Name | Date |
|---|---|---|
| 956,185 | Schoelkopl | Apr. 26, 1910 |
| 1,895,179 | Thresher | Jan. 24, 1933 |
| 1,987,035 | Tideman | Jan. 8, 1935 |
| 2,093,038 | Douglas | Sept. 14, 1937 |
| 2,179,380 | Nieman | Nov. 7, 1939 |
| 2,211,728 | MacFadden | Aug. 13, 1940 |
| 2,261,650 | Kost | Nov. 4, 1941 |
| 2,326,903 | Tinnerman | Aug. 17, 1943 |
| 2,333,386 | Murphy | Nov. 2, 1943 |
| 2,356,934 | Ketcham | Aug. 29, 1944 |
| 2,386,732 | Wohlhieter | Oct. 9, 1945 |
| 2,458,409 | Paige | Jan. 4, 1949 |
| 2,468,333 | Johnson | Apr. 26, 1949 |
| 2,539,172 | Andrews | Jan. 23, 1951 |
| 2,586,728 | Shepard | Feb. 19, 1952 |